US006814475B2

(12) United States Patent
Amano

(10) Patent No.: US 6,814,475 B2
(45) Date of Patent: Nov. 9, 2004

(54) LED-TYPE VEHICULAR LAMP HAVING UNIFORM BRIGHTNESS

(75) Inventor: Yasuyuki Amano, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 147 days.

(21) Appl. No.: 10/243,776

(22) Filed: Sep. 16, 2002

(65) Prior Publication Data

US 2003/0053318 A1 Mar. 20, 2003

(30) Foreign Application Priority Data

Sep. 19, 2001 (JP) ..................................... P.2001-285670

(51) Int. Cl.[7] ................................................. B60Q 1/00

(52) U.S. Cl. ....................... 362/487; 362/800; 362/498; 362/518; 362/521; 362/545; 362/240; 362/241; 362/243; 362/245; 362/309; 362/310

(58) Field of Search ................................ 362/299, 300, 362/309, 310, 244, 308, 487, 800, 498, 499, 518, 521, 545, 544, 543, 237, 240, 241, 243, 245

(56) References Cited

U.S. PATENT DOCUMENTS

| | | | | |
|---|---|---|---|---|
| 4,646,207 A | | 2/1987 | Levin et al. | |
| 5,054,885 A | | 10/1991 | Melby et al. | |
| 5,453,855 A | | 9/1995 | Nakamura et al. | |
| 5,890,794 A | * | 4/1999 | Abtahi et al. | 362/294 |
| 6,234,646 B1 | * | 5/2001 | Ito | 362/235 |
| 6,280,480 B1 | | 8/2001 | Tuttle et al. | |
| 2003/0035299 A1 | * | 2/2003 | Amano | 362/545 |

FOREIGN PATENT DOCUMENTS

| | | |
|---|---|---|
| DE | 19638081 | 3/1998 |
| EP | 0 830 984 A2 | 9/1997 |
| JP | 11-306810 | 11/1999 |

* cited by examiner

*Primary Examiner*—Sandra O'Shea
*Assistant Examiner*—Sharon Payne
(74) *Attorney, Agent, or Firm*—Sughrue Mion, PLLC

(57) ABSTRACT

A vehicular lamp that radiates light by indirect illumination and employing a plurality of LED light sources, wherein the entire reflective surface of the reflector has a substantially uniform brightness and the degree of freedom of designing the outer shape of the lamp is increased. First and second LED light source groups are formed by arranging a plurality of LED light sources back-to-back in a row. First and second lens groups are formed by arranging a plurality of Fresnel lenses for forming light from each of the LED light sources into parallel light fluxes with the directions of the parallel light fluxes of each LED light source group being aligned. First and second reflectors are provided for reflecting the parallel light fluxes from each of the lens groups forward of the lamp.

20 Claims, 6 Drawing Sheets

LED-TYPE VEHICULAR LAMP HAVING UNIFORM BRIGHTNESS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates to a vehicular lamp provided with a plurality of LED light sources, and more particularly to such a vehicular lamp which radiates light using an indirect illumination technique.

Recently, many vehicular lamps have been developed which employ an LED light source. For example, Japanese Patent Application Laid-Open No. 11-306810 discloses a vehicular lamp which provides a soft lighting effect utilizing indirect illumination wherein the LED source is arranged so as not to be visible from the front of the lamp. Further, German Laid-Open Patent Application No. 19638081 discloses a vehicular lamp which is provided with a Fresnel lens as well as an LED light source.

The vehicular lamp disclosed in the above-mentioned German patent application includes a plurality of LED light sources arranged at an upper end portion of the lamp facing downward, and a plurality of LED light sources arranged at a lower end portion of the lamp facing upward. Light from each of the LED light sources is directed downward or upward and formed into a parallel light flux by respective Fresnel lenses provided below or above the light sources, and the parallel light fluxes from each of the Fresnel lens are reflected toward the front of the lamp by a pair of upper and lower reflectors.

By combining an LED light source and a Fresnel lens facing upward, the light from the light source can be effectively utilized. In addition, by arranging a plurality of LED light sources at the upper and lower end portions of the lamp, it is easily possible to make the entire reflective surface have a substantially uniform brightness.

However, by arranging a plurality of LED light sources at the upper end portion and at the lower end portion of the lamp, as in the lamp of the above-mentioned German patent application, there is a problem in that the freedom in designing the outer shape of the lamp is restricted due to limitations in the layout of the LED light sources, the circuit board supporting the LED light sources, and the like.

BRIEF SUMMARY OF THE INVENTION

Taking the foregoing into consideration, it is an object of the present invention to provide a vehicular lamp that radiates light using an indirect illumination technique employing a plurality of LED light sources, and which results in the entire reflective surface having a substantially uniform brightness while enhancing the degree of freedom in the design of the outer shape of the lamp.

The present invention achieves the above and other objects by providing a vehicular lamp having an improved positional relationship between the LED light sources and between the lenses and the reflectors.

A vehicular lamp according to the present invention includes a plurality of LED light sources, a plurality of lenses for forming light from respective ones of the LED light sources into parallel light fluxes, a reflector for reflecting the parallel light fluxes from the lenses toward the front of the lamp, and a translucent cover provided on a front side of the lamp, wherein the plurality of LED light sources are constituted by first and second LED light source groups arranged back-to-back in a row, the plurality of lenses are constituted by first and second lens groups arranged in a row so that the directions of the parallel light fluxes of each of the LED light sources within each group are aligned, that is, the directions of the parallel light fluxes of each of the LED light sources within each group are parallel, and the reflector is formed by first and second reflectors that reflect the parallel light fluxes from respective ones of the lens groups.

Being arranged in a row as used herein means being arranged substantially linearly when viewed from the front of the lamp, with the linear direction of the row not being particularly limited.

The specific structure of the lenses is not particularly limited as far as the lenses can form the light from the LED light sources into parallel light fluxes. For example, it is possible to employ for each lens a single spherical lens, a combination lens, a Fresnel lens or the like.

The reflective surface constituting the first and second reflectors may be formed by a single curved surface or by a plurality of reflective elements.

The direction of the parallel light fluxes mentioned above is not limited to a specific direction as far as the direction intersects the longitudinal direction of the lamp. For example, it is possible to set it to an upward direction or a lateral direction by making it perpendicular to the longitudinal direction of the lamp.

As described above, in the vehicular lamp according to the present invention light from a plurality of LED light sources is formed into parallel light fluxes by a plurality of lenses, and the parallel light fluxes are reflected toward the front of the lamp by a reflector. The LED light sources are constituted by first and second LED light source groups arranged back-to-back in a row, the plurality of lenses are constituted by first and second lens groups arranged in a row such that the directions of the parallel light fluxes in each LED light source group are aligned, and the reflector is formed by first and second reflectors that reflect the parallel light fluxes from respective ones of the lens groups. With this lamp structure, the following operations and effects can be obtained.

Since the first and second LED light source groups are provided in correspondence with the first and second reflectors, it is easily possible for the entire reflective surface of the composite reflector to have a substantially uniform brightness. Further, since the first and second LED light source groups are arranged back-to-back in a row, the first and second reflectors are arranged on opposite sides of the first and second LED light source groups, making it possible to relatively freely select the shapes of end portions of the first and second reflectors.

According to the present invention, therefore, in a vehicular lamp which radiates light by indirect illumination and which employs a plurality of LED light sources, it is possible to cause the entire reflective surface to have a substantially uniform brightness and to enhance the degree of freedom in designing the outer shape of the lamp.

In the structure of the inventive vehicular lamp, the first and second LED light source groups may be mounted on different circuit boards, or they may be mounted on the same circuit board. If the latter structure is adopted, sharing of the circuit board decreases costs of the lamp and makes the light source portion of the lamp compact.

Further, by arranging the first and second LED light source groups in a horizontal direction in the structure described above, the following effects are obtained.

That is, in many vehicular lamps, the outer shape of the upper end portion of the lamp follows the shape of adjacent portions of the vehicle body. Since the first and second LED light sources are arranged in a horizontal direction, the first and second reflectors can be arranged on the upper and lower sides of the LED light sources. Therefore, it is easily possible to make the shape of the upper end portion of the lamp follow the decorative lines of the shape of the vehicle body.

The specific structures of the aforementioned first and second reflectors are not particularly limited. The first and second reflectors may be separated into sub reflectors for each area which the parallel light fluxes from each of the lenses constituting the first and second lens groups strike. In such a case, even if the lenses constituting the first and second lens groups are arranged such that they are displaced from one another in the longitudinal direction of the lamp according to the shape of the lamp or the like, the parallel light fluxes from each of the lenses can be reflected forward with good precision. The first and second reflectors may be integrally formed by a plurality of sub reflectors, or may be formed independently of sub reflectors. Further, the reflective surface of each of the sub reflectors may be formed by a single curved surface, or may be formed by a plurality of reflective elements.

In the structure described above, by further providing a dummy lens portion in the translucent cover, it is possible to prevent the light source portion (that is, the first and second LED light source groups and the first and second lens groups, etc.) from being directly visible when viewed from the front of the lamp. Accordingly, the appearance of the lamp can be further improved. The dummy lens portion, as used herein refers to a lens portion that does not contribute to light distribution control. The specific structure thereof is not particularly limited. For example, an RR (reflex reflector) or a lens portion provided with a decorative pattern may be employed.

DETAILED DESCRIPTION OF THE INVENTION

Hereafter, preferred embodiments of the present invention will be described with reference to the drawings.

Figure 1:
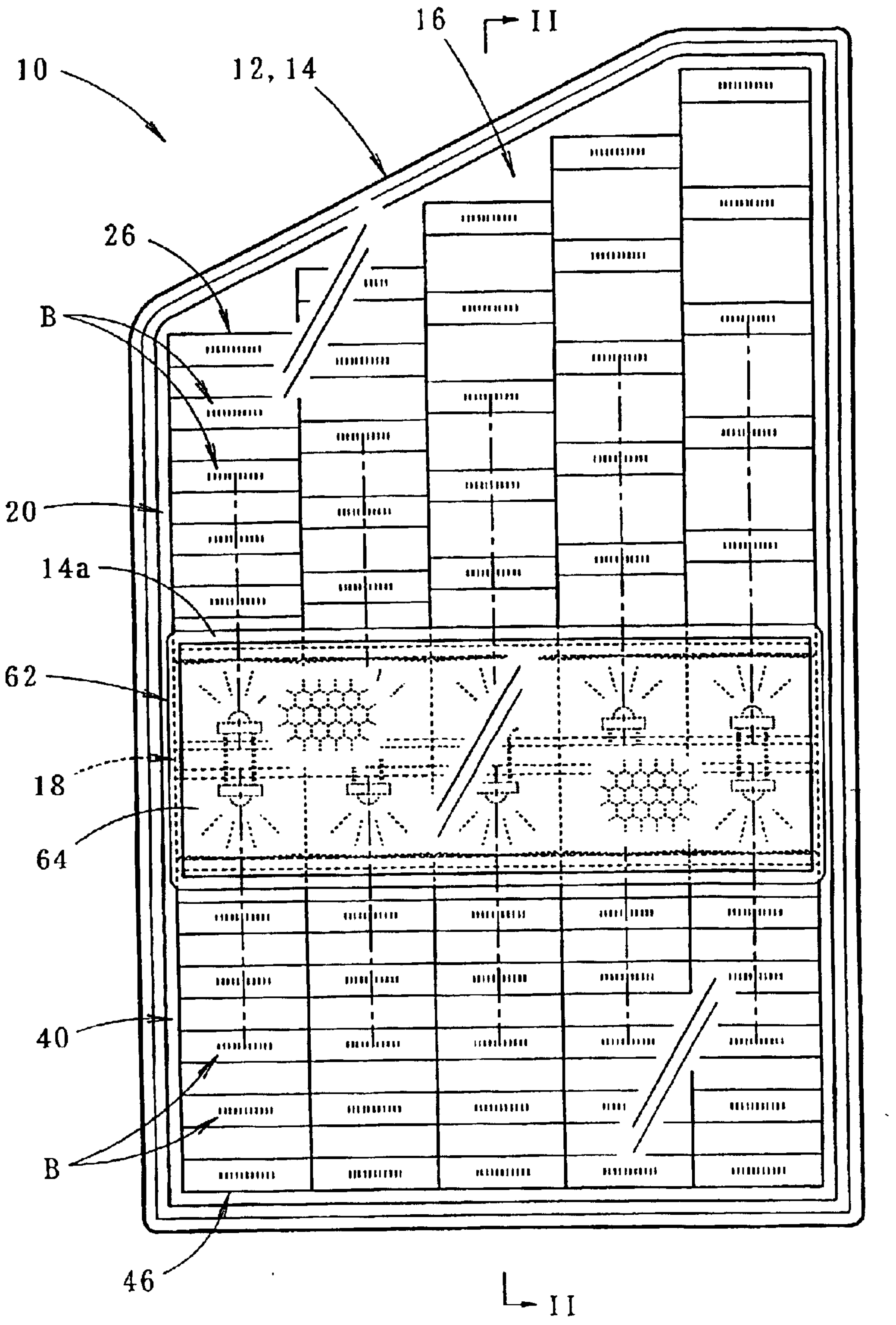
FIG. 1 is a front view of a vehicular lamp constructed according to a preferred embodiment of the present invention.
Figure 2:
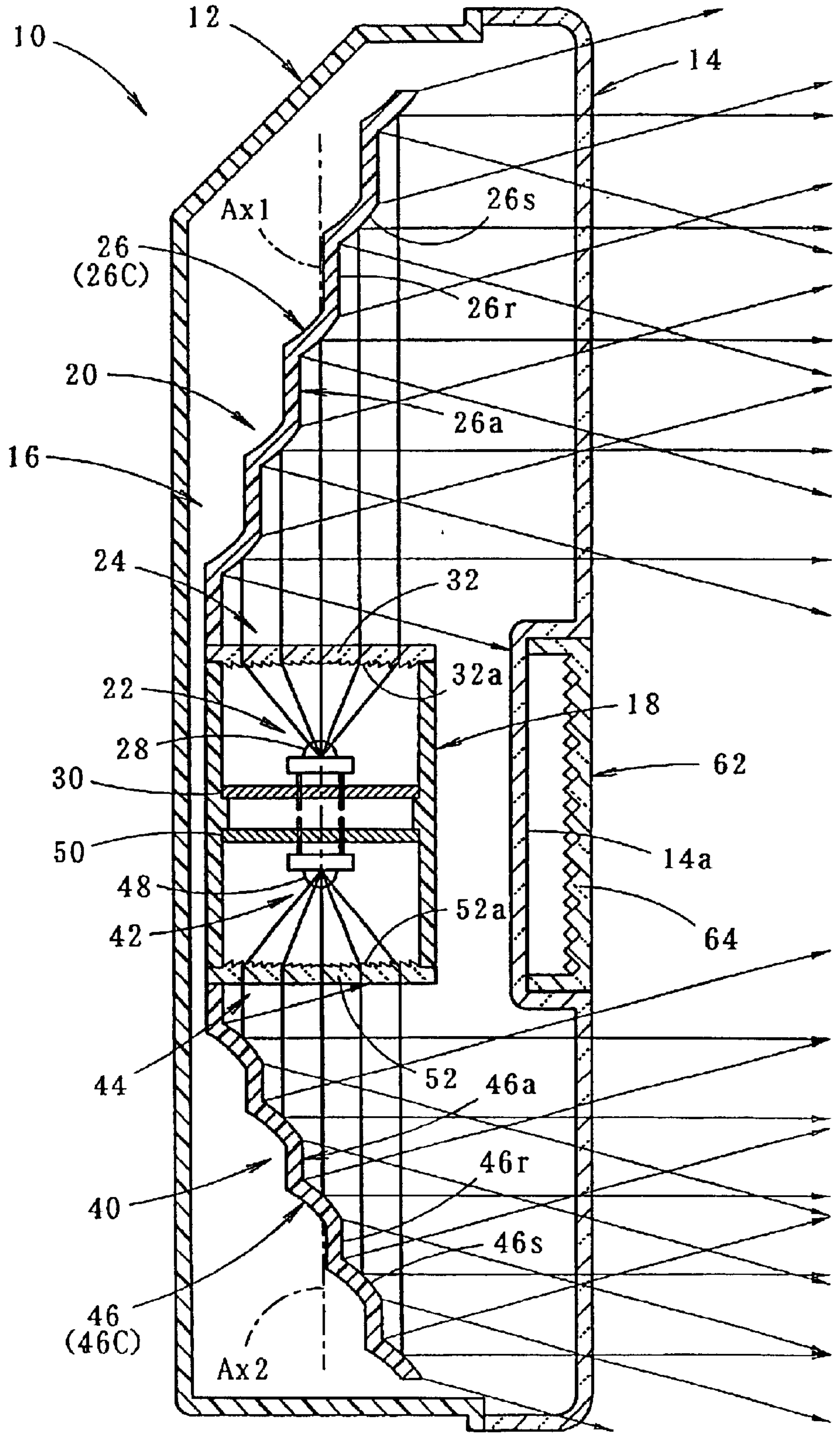
FIG. 2 is a cross-sectional view of the vehicular lamp of FIG. 1 taken along a line II—II in FIG. 1.

FIG. 1 is a front view of a vehicular lamp constructed according to the present invention, and FIG. 2 is a sectional view taken along a line II—II in FIG. 1.

As shown in these drawings, a vehicular lamp 10 according to the present embodiment takes the form of a rear combination lamp adapted to be mounted at a left corner portion at the rear end of a vehicle. The vehicular lamp 10 includes a lamp unit 16 housed within a lamp chamber formed by a lamp body 12 and a plain translucent cover 14.

Figure 3:
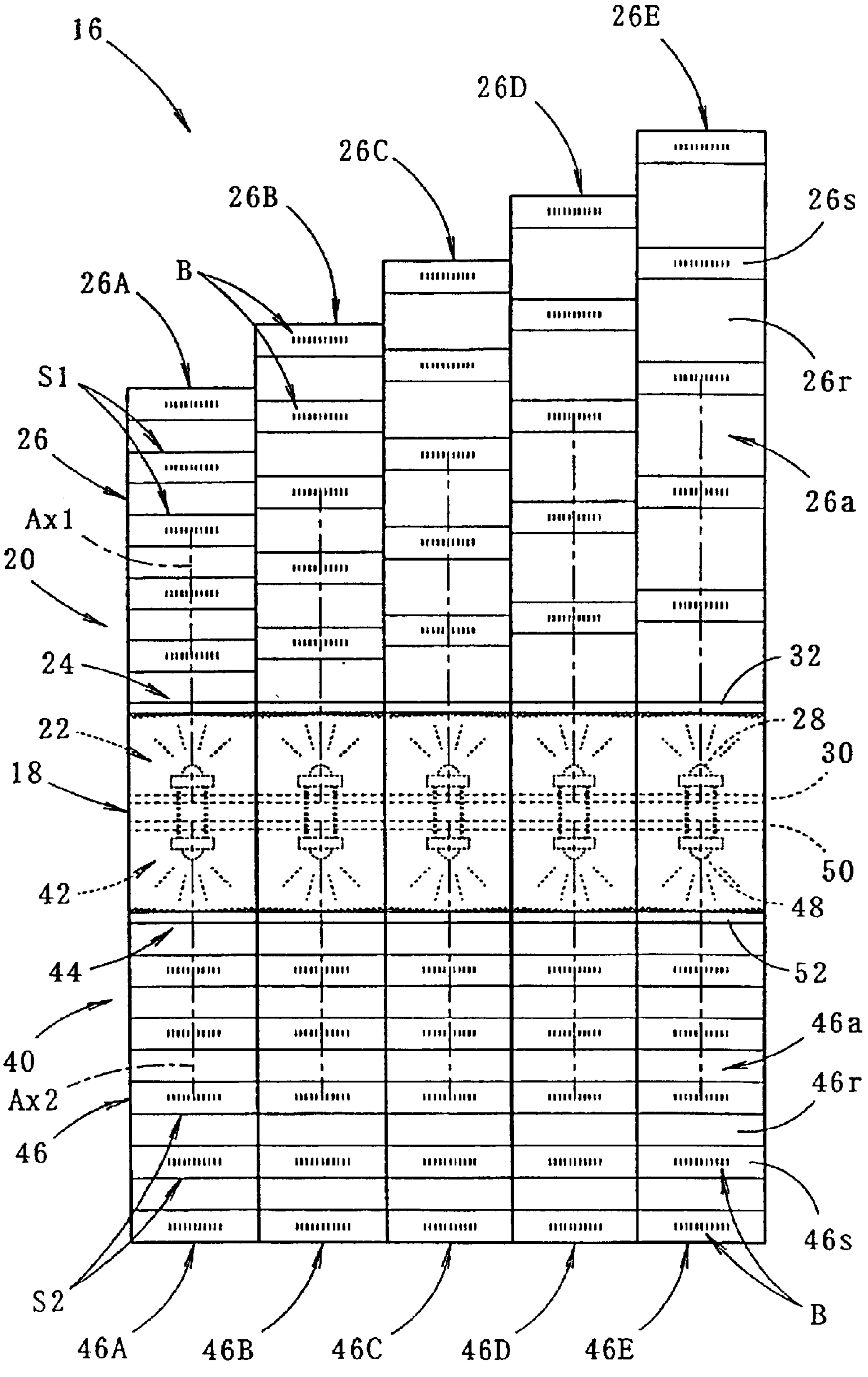
FIG. 3 is a front elevational view of a single unit of the lamp of FIG. 1.
Figure 4:
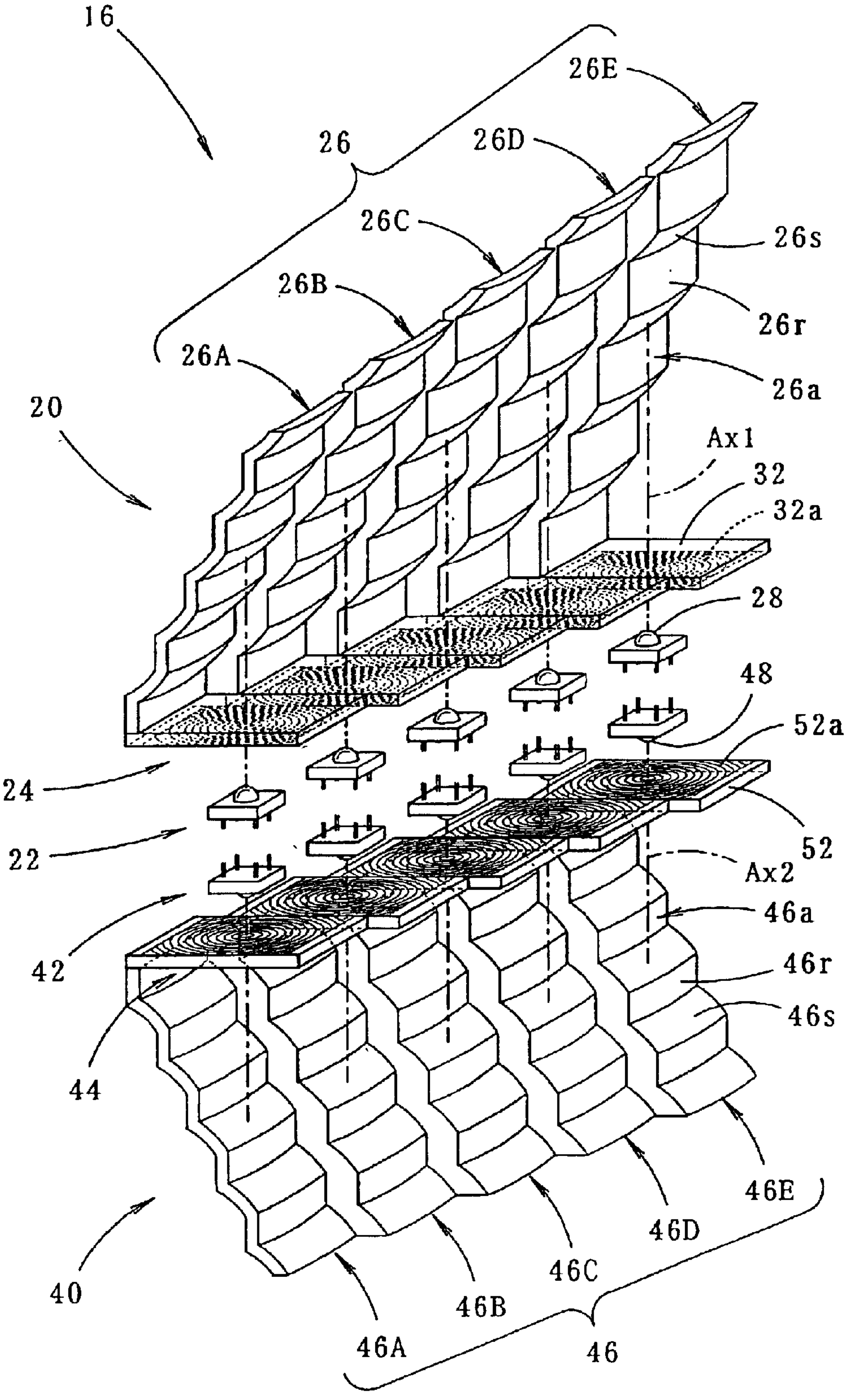
FIG. 4 is a perspective view of the lamp unit of FIG. 1 shown in a partly simplified manner.

FIG. 3 is a front elevational view of a single unit of the lamp unit 16, and FIG. 4 is a perspective view showing the lamp unit in a partly simplified manner.

As shown in these drawings, the lamp unit 16 is formed by a first lamp unit 20 functioning as a tail and stop lamp and a second lamp unit 40 functioning as a turn signal lamp.

The first lamp unit 20 is provided with a first LED light source group 22, a first lens group 24, and a first reflector 26.

The first LED light source group 22 is formed by a plurality (five) of LED light sources 28 arranged facing upward in the lateral direction at a substantially center portion of the lamp in the vertical direction, and is supported by a printed circuit board 30 that extends in the lateral direction.

The first lens group 24 is constituted by a plurality of Fresnel lenses 32 forming the light from each of the LED light sources 28 of the first LED light source group 22 into upward-directed parallel light fluxes. The Fresnel lenses 32 have an optical axis Ax1 that extends in the vertical direction so as to pass through a central position of each of the LED light sources 28. A Fresnel lens portion 32*a* is formed on the surface of the lower side thereof. The Fresnel lenses 32, each of which has a rectangular shape when viewed from the top, are arranged and connected to one another in a row extending in the lateral direction with the upper end faces thereof level.

The first reflector 26 is provided above the first lens group 24 so as to reflect the parallel light fluxes radiated upward from the Fresnel lenses 32 toward the front of the lamp (i.e., the rear of the vehicle; the same directional referenced is employed hereafter). The first reflector 26 is separated into sub reflectors 26A, 26B, 26C, 26D, and 26E, corresponding to respective ones of the LED light sources 28 and the Fresnel lenses 32.

Each of the sub reflectors 26A–26E is formed so as to extend upward, tilting to the front from a rear end portion of each of the Fresnel lens 32. The reflective surface 26*a* of each of the sub reflectors 26A–26E is sectioned into a plurality (five) of segments S1 at uniform intervals with respect to the vertical direction. A reflective element 26*s* and a step portion 26*r* are provided in each of the segments S1, whereby the reflective surface 26*a* is formed in a stepped shape. Each reflective element 26*s* reflects the parallel light flux from one of the Fresnel lenses 32 toward the front of the lamp in a diffused manner.

Each of the reflective elements 26*s* is formed by a substantially spherical curved surface so as to reflect the parallel light fluxes from the Fresnel lenses 32 in a diffused manner at predetermined diffusion angles in vertical and lateral directions with respect to the directly forward direction of the lamp. The diffusion angles in the vertical and lateral directions of each of the reflective elements 26*s* are the same among the respective reflective elements 26*s*. Each of the step portions 26*r* extends in a vertical plane so that the parallel light fluxes from the Fresnel lens 32 do not strike the step portions 26*r*.

The height of each of the sub reflectors 26A–26E gradually increases from the sub reflector 26A at the left end portion to the sub reflector 26E at the right end portion. With this arrangement, the shape of the upper edge of the first reflector 26 is made to follow the shape of the translucent cover 14, which is formed such that the height of the upper end thereof gradually decreases from the right end portion to the left end portion. To achieve this, the height of each of the segments S1 is made to gradually increase from the sub reflector 26A at the left end portion to the sub reflector 26E at the right end portion. Since the sub reflectors 24A–24E reflect the parallel light fluxes from the Fresnel lenses 32 toward the front of the lamp, the smaller the height of the sub reflector, the larger the tilt angle to the front of the lamp.

The second lamp unit 40 is provided with an LED light source group 42, a second lens group 44, and a second reflector 46.

The second LED light source group 42 is formed by a plurality (five) of LED light sources 48 arranged back-to-back with respect to the front LED light source group 22. The second LED light source group 42 faces downward in the lateral direction at a substantially center portion of the lamp in the vertical direction, and is supported by a circuit board 50 that extends in the lateral direction.

The second lens group 44 is formed by a plurality of Fresnel lenses 52 which form light from each of the LED light sources 48 constituting the second LED light source group 42 into upward parallel light fluxes. The Fresnel lenses are disposed below and in the vicinity of the second LED light source group 42. The Fresnel lenses 52 have an optical axis Ax2 that extends in the vertical direction and passes through a central position of each of the LED light sources 48. A Fresnel lens portion 52*a* is formed on the upper surface thereof. The Fresnel lenses 52, each of which has a rectangular shape when viewed from the top, are arranged and fixed to one another in a row extending in the lateral direction with the upper end faces thereof level.

The second reflector 46 is provided below the second lens group 44 so as to reflect the parallel light fluxes radiated downward from the Fresnel lenses 52 toward the front of the lamp. The second reflector 46 is separated into sub reflectors 46A, 46B, 46C, 46D, and 46E for each of the LED light sources 48 and the Fresnel lenses 52.

Each of the sub reflectors 46A–46E is formed so as to extend downward, tilting to the front from a rear end portion of each of the Fresnel lens 52. The reflective surface 46*a* of each of the sub reflectors 46A–46E is sectioned into a plurality of segments (five segments) S2 at uniform intervals with respect to the vertical direction. A reflective element 46*s* and a step portion 46*r* are provided in each of the segments S2, and thus the reflective surface 46*a* has a stepped shape. Further, each reflective element 46*s* is structured so as to reflect the parallel light fluxes from the corresponding Fresnel lenses 52 toward the front of the lamp in a diffused manner.

Each of the reflective elements 46*s* is formed by a substantially spherical curved surface so as to reflect the parallel light fluxes from the Fresnel lenses 52 in a diffused manner at predetermined diffusion angles in vertical and lateral directions with respect to the directly forward direction of the lamp. The diffusion angles in the vertical direction and lateral directions of each of the reflective elements 46*s* are the same among the reflective elements 46*s*. Each of the step portions 46*r* is formed in a vertical plane so that the parallel light fluxes from the Fresnel lens 52 do not strike the step portions.

As shown in FIG. 4, the lamp unit 16 is formed so as to slope toward the rear of the lamp from the right side to the left side, therefore being capable of following the shape of the surface of the translucent cover 14 when formed to follow the shape of the vehicle body at the left side of the vehicle. In accordance with this design, in the first lamp unit 20 each of the sub reflectors 26A–26E constituting the first reflector 26, as well as each of the LED light sources 28 and the Fresnel lenses 32 that correspond thereto, are arranged in a stepped shape, sloping toward the rear of the lamp from the right side to the left side of the first lamp unit 20. In addition, in the second lamp unit 40, each of the sub reflectors 46A–46E constituting the second reflector 46, as well as each of the LED light sources 48 and the Fresnel lens 52 that correspond thereto, are arranged in a stepped shape sloping toward the rear of the lamp from the right side to the left side of the first lamp unit 40.

As shown in FIGS. 2 and 3, the circuit boards 30, 50 of the first and second lamp units 20, 40 are supported by a light source housing 18 extending in the lateral direction at a substantially central portion in the vertical direction of the lamp. The first and second lens groups 24, 44 of the first and second lamp units 20, 40 are supported by an upper end portion and the lower end portion of the light source housing 18.

As shown in FIGS. 1 and 2, a dummy lens portion 62 is provided at a front portion of the light source housing 18 on the translucent cover 14. The dummy lens portion 62 may be formed as an RR (reflex reflector) mounted in a rectangular recess portion 14*a* formed in the translucent cover 14.

As described above in detail, in the vehicular lamp 10 of the present embodiment lights from the LED light sources 28, 48 is formed into parallel light fluxes by the Fresnel lenses 32, 52, and the parallel light fluxes are reflected toward the front of the lamp by the reflector. The LED light sources 28, 48 are formed by the first and second LED light source groups 22, 42, in each of which a plurality of light sources are arranged back-to-back in a row. The Fresnel lens 32, 52 formed by the first and second lens groups 24, 44 are also arranged in a row and arranged such that the directions of the parallel light fluxes of each of the LED light sources within each group are aligned with one another. Further, the reflector is formed by the first and second reflectors 26, 46 that reflect the parallel light fluxes from each of the lens groups 24, 44. With this construction, the following effects are obtained.

That is, since the first and second LED light sources 22, 42 are provided in correspondence with the first and second reflectors 26, 46, the entire reflective surface of the reflector has a substantially uniform brightness. Further, since the first and second LED light sources 22, 42 are arranged back-to-back in a row and the first and second reflectors 26, 46 are arranged on both sides of the first and second LED light source groups 22, 42, it is possible to relatively freely design the shapes of the end portions of the first and second reflectors 26, 46.

Therefore, according to the present invention, in a vehicular lamp structured so as to radiate light by indirect illumination using a plurality of LED light sources, it is possible for the entire reflective surface of the reflector to have a substantially uniform brightness while enhancing the degree of freedom in the design of the outer shape of the lamp.

Further, in the present embodiment, since the first and second LED light sources 22, 42 are arranged in the horizontal direction, the shape of the upper end of the first reflector 26, as well as the shape of the lower end of the second reflector 46, can be set relatively freely. Accordingly, the outer shape of the upper end portion of the lamp can readily be designed to a decorative line following the shape of the vehicle body.

Further, according to the present embodiment, the first and second reflectors 26, 46 are separated into the sub reflectors 26A–26E, 46A–46E for each area that the parallel light fluxes from each of the Fresnel lenses 32, 52 constituting the first and second lens groups 24, 44 strike. Therefore, despite the fact that the Fresnel lenses 32, 52 are arranged at positions displaced (offset) from one another in the longitudinal direction of the lamp, the parallel light fluxes from the lenses 32, 52 can be reflected forward with good precision.

Still further, the reflective surfaces 26*a*, 46*a* of each of the reflectors 26A–26E, 46A–46E are sectioned into the segments S1, S2 arranged in the vertical direction, and the reflective elements 26*s*, 46*s* and the step portions 26*r*, 46*r* are provided in each of the segments S1, S2, thereby forming the reflective surfaces 26*a*, 46*a* in a stepped shape. With this arrangement, it is possible to efficiently radiate light toward the front of the lamp.

Each of the reflective elements 26*s*, 46*s* is formed by a curved surface that reflects the corresponding parallel light fluxes from the Fresnel lenses 32, 52 in the vertical and lateral directions in a diffused manner. Therefore, even if the translucent cover 14 is of a plain configuration, the required light distribution performance of the lamp is ensured. Moreover, the following effects can be obtained.

That is, as shown in FIG. 1, when viewing the lamp unit 16 in the lighted state from a position directly in front of the lamp, the reflective surfaces 26*a*, 46*a* of each of the sub reflectors 26A–6E, 46A–6E appear to be lit in a scattered manner in all directions at each of the reflective elements 26*s*, 46*s*, with a bright portion B at the center of each of the reflective elements 26*s*, 46*s*. Further, when changing a viewing position upward, downward, left, and right from a position directly in front of the lamp, the position of the bright portion B also moves upward, downward, left, and right within each of the reflective elements 24*s*. However, since the diffusion angles of each of the reflective elements 26*s*, 46*s* are the same among the respective reflective elements 24*s*, 46*s*, all the reflective elements 26*s*, 46*s* appear to have substantially the same brightness, until the limits of the diffusion angles are exceeded, whereupon all the reflective elements 24*s*, 46*s* become dark at once. Accordingly, the appearance of the lamp changes as the viewing position is changed, and thus the appearance of the lamp is further improved.

Rather than constructing each of the reflective elements 26*s*, 46*s* with a substantially spherical curved surface as in the embodiment described above, it is possible to diffuse light in the vertical and lateral directions by constructing each of the reflective elements 26*s*, 46*s* as a flat plane so as to reflect the parallel light fluxes from the Fresnel lenses 32, 52 toward the front of the lamp without diffusion, that is, while maintaining the light fluxes in a parallel state, while forming diffusion lens elements in the translucent cover 14 (or in a separately provided inner lens). Alternatively, it is possible to reflect the parallel light fluxes from the Fresnel lenses 32, 52 toward the front of the lamp in a diffused manner only in one direction by constructing each of the reflective elements 26*s*, 46*s* by a curved surface having curvature only in one direction while diffusing the light in a direction perpendicular to the one direction mentioned above by forming diffusion lens elements in the translucent cover 14 or the like.

In the aforedescribed embodiment, the dummy lens portion 62 is provided at a front portion of the light source housing 18 in the translucent cover 14. Therefore, when viewing the lamp from a viewing position directly to the front of the lamp, it is possible to prevent the light source housing 18 and the first and second lens groups 24, 44 from directly being visible, whereby the appearance of the lamp is improved. In this case, an RR (reflex reflector) 64 is arranged in the dummy lens portion 62, and therefore a portion of the translucent cover which would otherwise be ineffective in terms of lamp light distribution can be effectively used.

Next, a modified example of the present embodiment will be explained.

Figure 5:
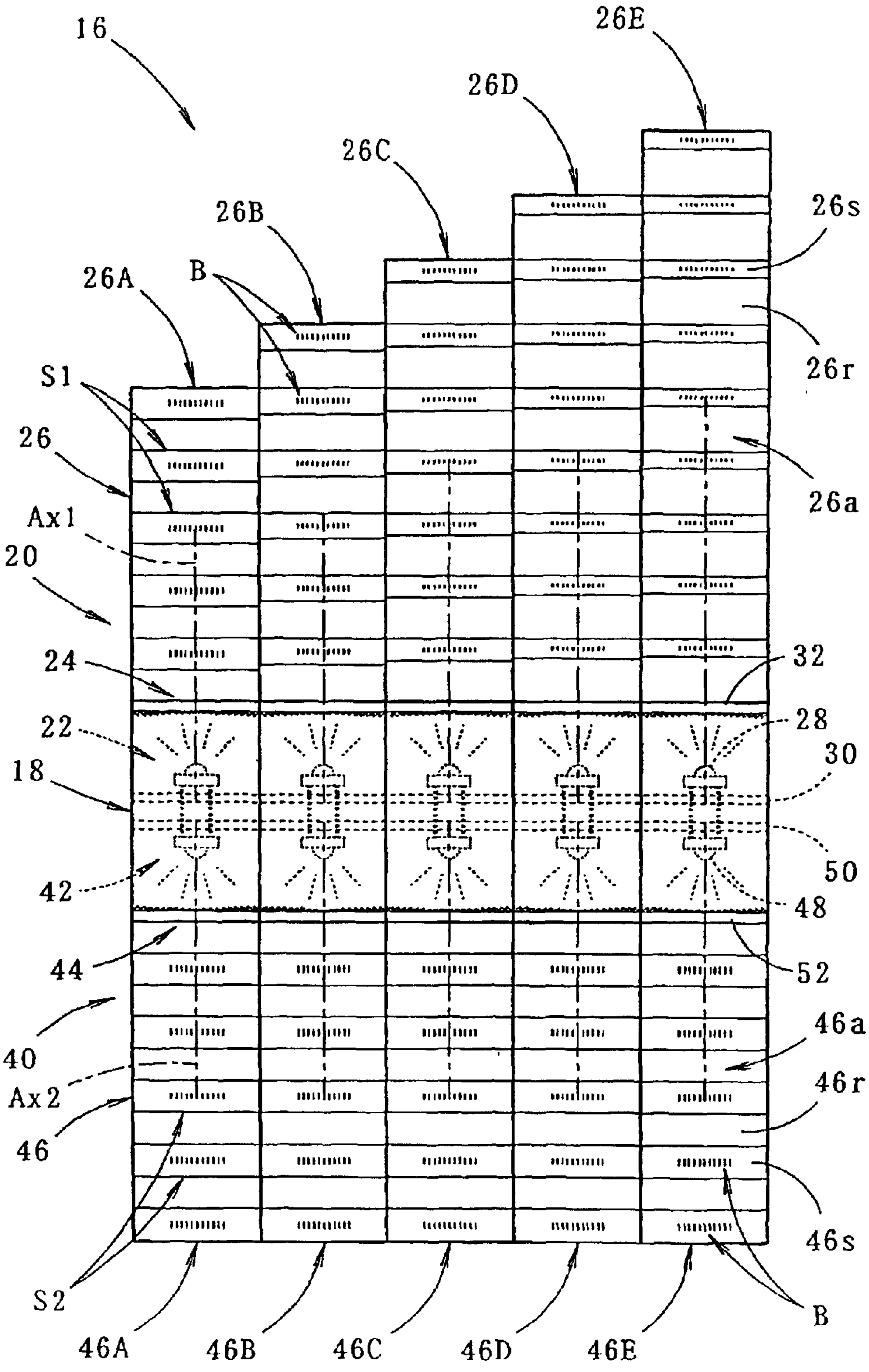
FIG. 5, which is a view similar to FIG. 3, shows a modified example of a vehicular lamp of the invention.

In the embodiment above, each of the reflective surfaces 26*a* of each of the sub reflectors 26A–26E constituting the first reflector 26 is sectioned into five segments S1. The vertical pitch of each of the segments S1 is structured so as to gradually increase from the sub reflector 26A at the left side of the lamp to the sub reflector 26E at the right side. In the modified example, as shown in FIG. 5, the vertical pitch of the segments S1 sectioning the reflective surface 26*a* of each of the sub reflectors 26A–26E may be the same but the number of the segments S1 sequentially increases from the sub reflector 26A at the left side to the sub reflector 26E at the right side.

With such a structure, the height of the reflective elements 26*s* of each of the segments S1 gradually decreases from the sub reflector 26A at the left side of the lamp to the sub reflector 26E at the right side. However, because the sizes of all the segments S1 appear equal when viewed from the front of the lamp, the first reflector 26 has a uniform appearance when the lamp unit 16 is lighted, so that the appearance of the first reflector 26 is enhanced.

Figure 6:
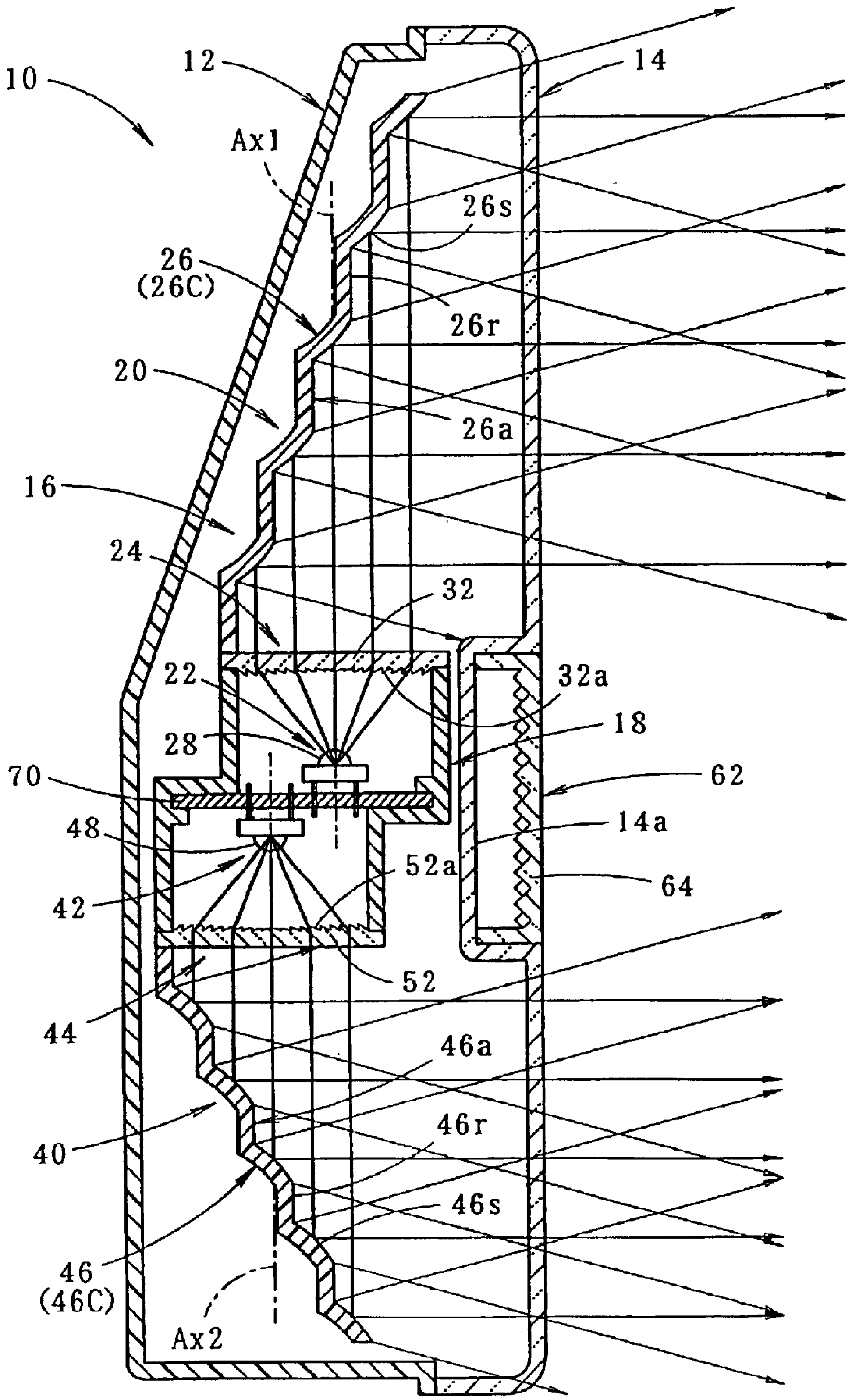
FIG. 6, which is a view similar to FIG. 2, shows another modified example of the vehicular lamp of the invention.

In the embodiments described above the first and second LED light source groups 22, 42 are mounted on separate circuit boards 30, 50. However, as shown in FIG. 6, the first and second LED light source groups 22, 42 may be mounted on the same printed circuit board 70. With such a structure, the cost of the lamp can be reduced because only a single circuit board is employed, and also the light source section of the lamp can be made smaller. Additionally, since the height of the dummy lens portion 62 can be made smaller in such a case, the appearance of the lamp can be further improved.

In this modified example, each of the LED light sources 28 constituting the first LED light source group 22 and each of the LED light sources 48 constituting the second LED light source group 42 are provided at locations offset from one another in the longitudinal direction. However, a modified structure may be adopted, such as one in which each of the LED light sources 28 constituting the first LED light source group 22 and each of the LED light sources 48 constituting the second LED light source group 42 are provided at locations offset from one another in the lateral direction.

The embodiments described above relate to the case where the first and second LED light source groups 22, 42 are arranged in the lateral direction. However, similar operations and effects can be obtained in a case where the first and second LED light source groups 22, 42 are arranged in the vertical direction.

Also, the explanation above relates to the case where the vehicular lamp 10 is embodied as a rear combination lamp with both a tail and stop lamp function and a turn signal lamp function. However, the invention can otherwise be embodied as a vehicular lamp such as a tail and stop lamp, a turn signal lamp, a clearance lamp or the like, or a lamp such as a rear combination lamp with a tail and stop lamp function and a clearance lamp function or the like, while obtaining similar operations and effects.

It should further be apparent to those skilled in the art that various changes in form and detail of the invention as shown and described above may be made. It is intended that such changes be included within the spirit and scope of the claims appended hereto.

What is claimed is:

1. A vehicular lamp comprising:

first and second LED light source groups, each of said first and second LED light source groups comprising a plurality of LED light sources arranged in a row, said first and second LED light source groups being arranged back-to-back;

first and second lens groups, each of said first and second lens groups comprising a plurality of lenses arranged in a row, each of said lenses forming light from a corresponding one of said LED light sources into a parallel light flux, parallel light fluxes produced by ones of said lenses within each of said first and second lens groups being aligned with one another;

first and second reflectors reflecting said parallel light fluxes from said first and second lens groups, respectively, toward a front of said lamp; and a translucent cover provided on said front of said lamp.

2. The vehicular lamp according to claim 1, wherein said first and second LED light source groups are mounted on opposite sides of a single circuit board.

3. The vehicular lamp according to claim 1, wherein said first and second LED light source groups are arranged in a horizontal direction.

4. The vehicular lamp according to claim 1, wherein each of said first and second reflectors comprise a plurality of sub reflectors, one of said sub reflectors being provided for each area that parallel light fluxes from each of said lenses strike.

5. The vehicular lamp according to claim 4, wherein each of said sub reflectors comprises a plurality of reflective elements and step portions alternating with one another and arranged in a stepped configuration.

6. The vehicular lamp according to claim 5, wherein each of said reflective elements has a surface shaped to reflect light in a diffused manner in horizontal and vertical directions.

7. The vehicular lamp according to claim 5, wherein each of said reflective elements has a surface shaped to reflect light in a diffused manner in one of horizontal and vertical directions, and further comprising lens elements for diffusing light in the other of said horizontal and vertical directions.

8. The vehicular lamp according to claim 5, wherein a height of said sub reflectors of at least one of said reflectors decreases from one side of said lamp to the other side of said lamp.

9. The vehicular lamp according to claim 5, wherein a height of said step portions of said sub reflectors decreases from one side of said lamp to the other side of said lamp.

10. The vehicular lamp according to claim 1, further comprising a dummy lens portion provided in said translucent cover on a front side of said first and second LED light source groups.

11. The vehicular lamp according to claim 10, wherein said dummy lens portion is located in a middle portion of said translucent cover.

12. The vehicular lamp according to claim 1, wherein each of said lenses comprises a Fresnel lens.

13. A vehicular lamp comprising:

first and second LED light source groups, each of said first and second LED light source groups comprising a plurality of LED light sources arranged in a row, said first and second LED light source groups being arranged back-to-back to as to direct light in opposite directions;

first and second lens groups, each of said first and second lens groups comprising a plurality of Fresnel lenses arranged in a row with adjacent ones of said Fresnel lenses being displaced from one another in a longitudinal direction of said lamp, each of said lenses forming light from a corresponding one of said LED light sources into a parallel light flux, parallel light fluxes produced by ones of said lenses within each of said first and second groups being aligned with one another; and said parallel light fluxes produced by ones of said lenses within said first and second groups being directed in opposite directions;

first and second reflectors reflecting said parallel light fluxes from each of said first and lens groups toward a front of said lamp, each of said first and second reflectors comprising a plurality of sub reflectors, one of said sub reflectors being provided for each of said lenses, and each of said sub reflectors comprising a plurality of reflective elements and step portions alternating with one another and arranged in a stepped configuration; and a translucent cover provided on said front of said lamp.

14. The vehicular lamp according to claim 13, wherein said first and second LED light source groups are mounted on opposite sides of a single circuit board.

15. The vehicular lamp according to claim 13, wherein said first and second LED light source groups are mounted on separate circuit boards.

16. The vehicular lamp according to claim 13, wherein said first and second LED light source groups are arranged in a horizontal direction.

17. The vehicular lamp according to claim 13, wherein each of said reflective elements has a surface shaped to reflect light in a diffused manner in horizontal and vertical directions.

18. The vehicular lamp according to claim 13, wherein each of said reflective elements has a surface shaped to reflect light in a diffused manner in one of horizontal and vertical directions, and further comprising lens elements for diffusing light in the other of said horizontal and vertical directions.

19. The vehicular lamp according to claim 3, further comprising a dummy lens portion provided in said translucent cover on a front side of said first and second LED light source groups.

20. The vehicular lamp according to claim 19, wherein said dummy lens portion is located in a middle portion of said translucent cover.

* * * * *